(12) United States Patent
Green et al.

(10) Patent No.: US 6,286,864 B1
(45) Date of Patent: Sep. 11, 2001

(54) ULTRA LOW COST INFLATOR DEVICE AND METHOD OF MANUFACTURING SUCH

(75) Inventors: David J. Green; Anthony M. Young, both of Brigham City; Glade G. Sutherland, Roy; David B. Monk, Kaysville; Mark B. Woodbury, North Salt Lake, all of UT (US)

(73) Assignee: Autoliv ASp, Inc., Ogden, UT (US)

( * ) Notice: Subject to any disclaimer, the term of this patent is extended or adjusted under 35 U.S.C. 154(b) by 0 days.

(21) Appl. No.: 09/191,703

(22) Filed: Nov. 13, 1998

(51) Int. Cl.[7] .................................................. B60R 21/28
(52) U.S. Cl. ............................................ 280/741; 280/736
(58) Field of Search ...................................... 280/736, 737, 280/741

(56) References Cited

U.S. PATENT DOCUMENTS

| | | |
|---|---|---|
| 5,066,038 | 11/1991 | Frantom et al. . |
| 5,199,740 | 4/1993 | Frantom et al. . |
| 5,301,979 * | 4/1994 | Allard .................................. 280/737 |
| 5,404,263 * | 4/1995 | Graves et al. . |
| 5,409,259 | 4/1995 | Cunningham et al. . |
| 5,454,320 | 10/1995 | Hilden et al. . |
| 5,456,492 | 10/1995 | Smith et al. . |
| 5,466,313 * | 11/1995 | Brede et al. . |
| 5,496,062 * | 3/1996 | Rink et al. ............................. 280/737 |
| 5,558,366 | 9/1996 | Fogle, Jr. et al. . |
| 5,577,769 * | 11/1996 | DiGiacomo et al. ................. 280/736 |
| 5,589,141 * | 12/1996 | Sides et al. ...................... 280/741 X |
| 5,639,986 | 6/1997 | Evans . |
| 5,648,634 | 7/1997 | Avory et al. . |
| 5,669,629 * | 9/1997 | Rink ...................................... 280/741 |
| 5,711,531 | 1/1998 | Avory et al. . |
| 5,713,595 * | 2/1998 | Mooney et al. ....................... 280/736 |
| 5,728,964 | 3/1998 | Avory et al. . |
| 5,732,634 * | 3/1998 | Flickinger et al. . |
| 5,763,814 | 6/1998 | Avory et al. . |
| 5,763,817 * | 6/1998 | Renfroe et al. .................. 280/736 X |
| 5,788,275 | 8/1998 | Butt et al. . |
| 5,803,493 | 9/1998 | Paxton et al. . |
| 5,988,069 * | 11/1999 | Bailey . |

FOREIGN PATENT DOCUMENTS

779492A2 * 6/1997 (EP) .

* cited by examiner

Primary Examiner—Paul N. Dickson
Assistant Examiner—Bryan Fischmann
(74) Attorney, Agent, or Firm—Sally Brown; James Erickson

(57) ABSTRACT

An inflator assembly for an airbag safety system that comprises a container having a chamber configured to hold pressurized gases, an igniting assembly for producing exit gases and a diffusing assembly to vent the exit gases. The container is provided with an end closure that is composed of a material having a substantial silicon content. The diffusing assembly includes a diffuser cap and a burst disk. The diffuser cap has a number of apertures formed therein that allow the exit gases to be released when the burst disk ruptures. The igniting assembly is configured such that it may be coupled to the end closure and capable of withstanding a heat treatment process that bonds the igniting assembly, end closure and container together to form a one-piece structure.

33 Claims, 2 Drawing Sheets

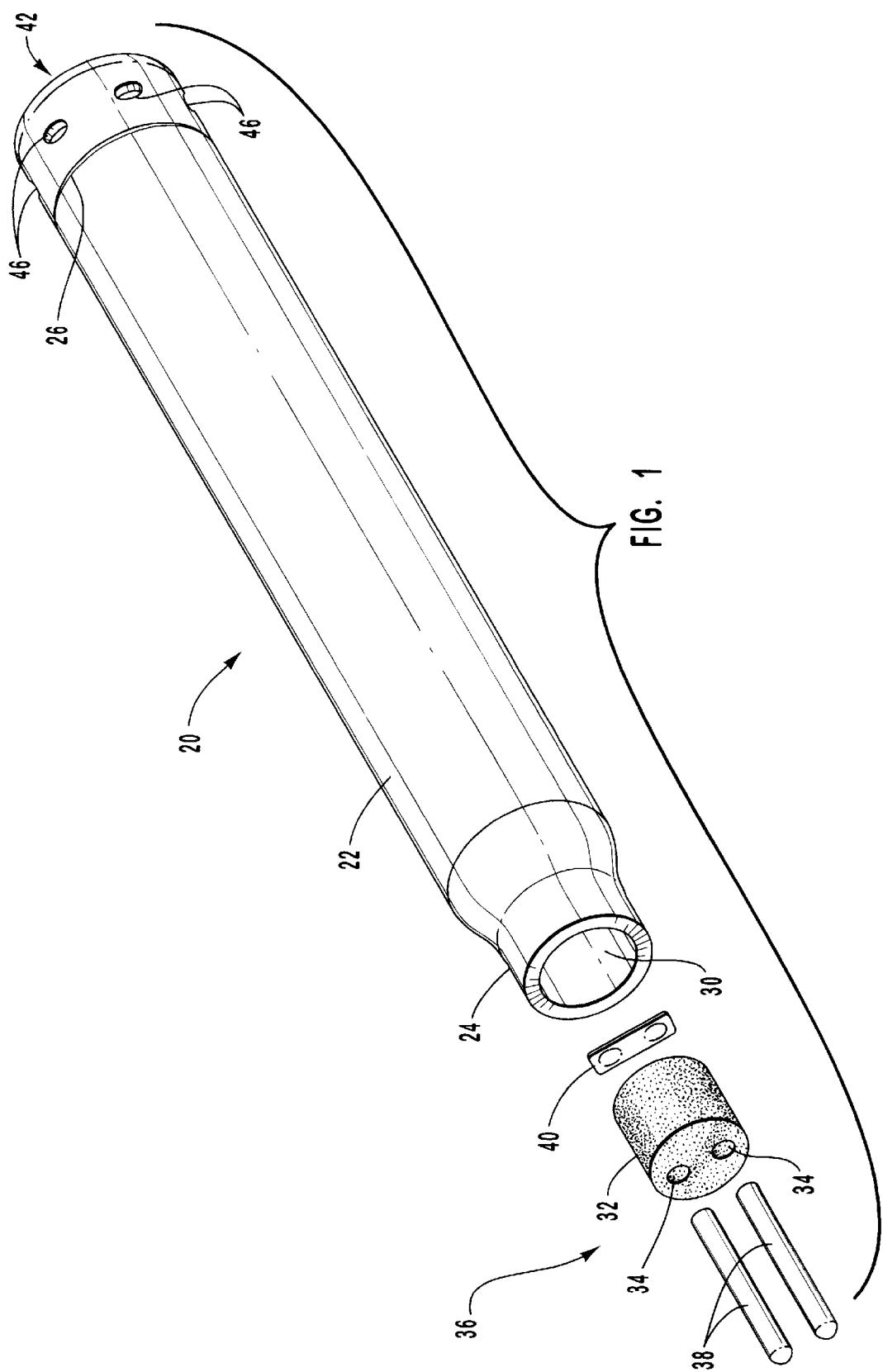

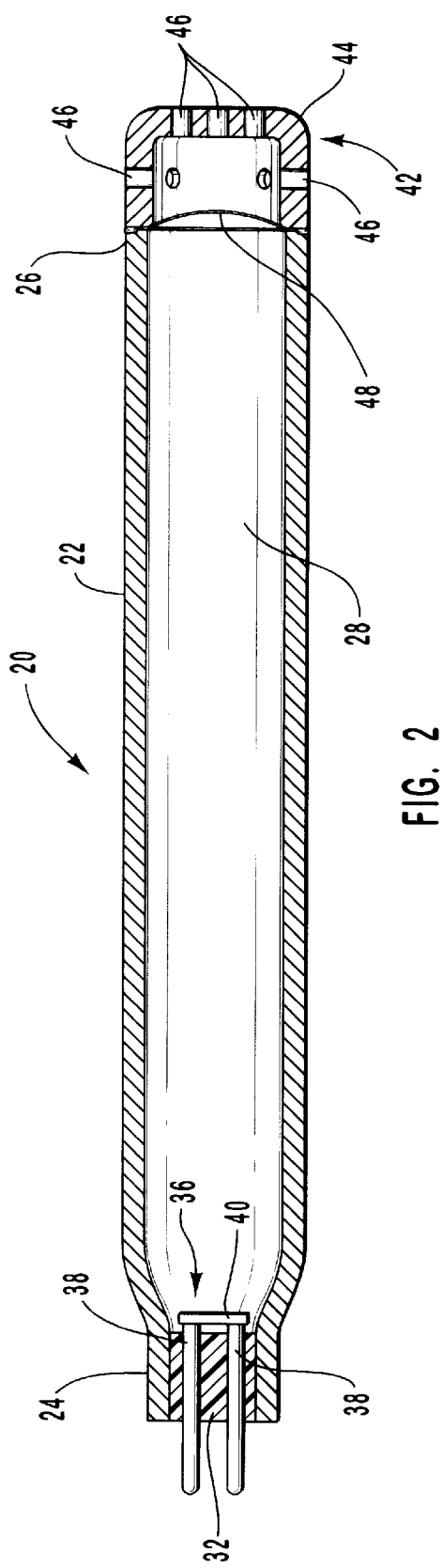
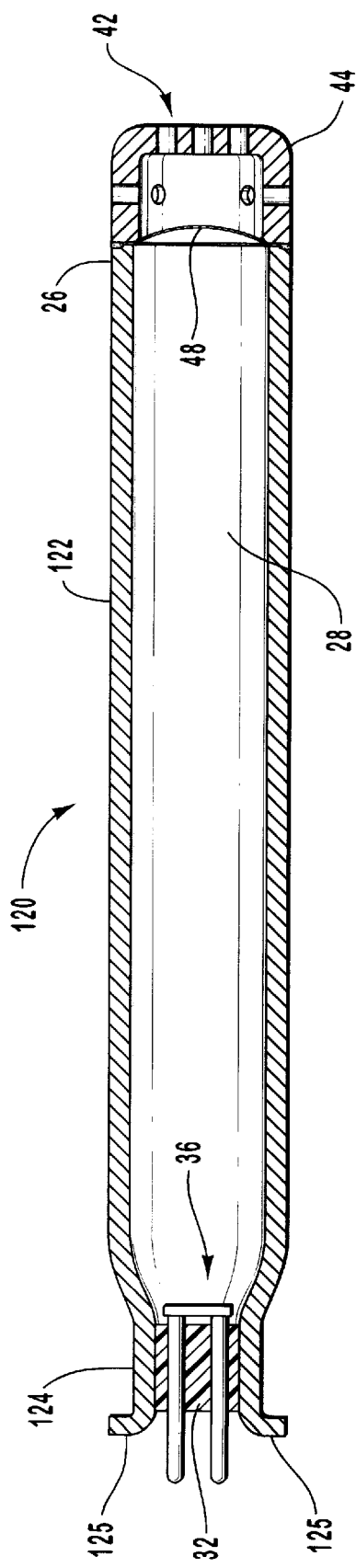

ULTRA LOW COST INFLATOR DEVICE AND METHOD OF MANUFACTURING SUCH

BACKGROUND OF THE INVENTION

1. The Field of the Invention

The present invention generally relates to a safety device used particularly in motor vehicles. More particularly this invention relates to a compressed gas inflator used to inflate an airbag or cushion during a collision.

2. The Relevant Technology

As individuals travel within a vehicle it is necessary to restrain them in case of a collision. Traditionally, a safety belt would secure an individual in place. The safety belt would laterally and diagonally cross a passenger or driver's body, and be anchored to the body of the car. Unfortunately, safety belts only give limited protection from head or neck injury during a collision and associated rapid deceleration.

With the advances in technology, it has become well known to protect a vehicle's occupant using an inflatable device, such as an airbag or cushion. An airbag is manufactured from a fabric bag which is rapidly inflated or expanded with gases which exit an inflatable device. These gases are termed exit gases. The airbag is activated when the vehicle encounters sudden deceleration, such as in a collision with another vehicle or structure. The airbag allows a reasonable deceleration of an occupant's body in a collision and prevents the impact of the head into the steering wheel or passenger side dashboard.

Prior to its inflation, the airbag is in a deflated and/or folded condition to minimize the space required to house the airbag. In the event of a collision, however, the airbag inflates in a matter of no more than a few milliseconds to provide occupant protection. The exit gases are supplied to the airbag by a device commonly referred to as "an inflator." An inflator may be of various sizes and/or configurations. For example, a stored gas inflator typically requires the storage of a highly pressurized gas. As a result of the high storage pressures, the walls of the gas storage chamber are relatively thick, thereby resulting in heavy and bulky inflator designs.

Another type of inflator is a pyrotechnic inflator. A pyrotechnic inflator utilizes a combustible gas generating material to create the exit gases used to inflate the airbag. The combustible gas generating material produces gases with high temperature, typically ranging from about 500° F. (260° C.) to 1200° F. (649° C.). These temperatures are dependent on numerous interrelated factors including the desired level of inflator performance, as well as the type and amount of gas generating material used. For example, the level of inflator performance is defined by numerous crash variables, and those variables define the size and configuration of the inflator and airbag. The variables may include the severity of the crash, the size and position of the occupants, and the temperature conditions that may affect the performance of the inflator.

Yet another type of inflator is a hybrid inflator. A hybrid inflator utilizes a combination of stored pressurized gas and a pyrotechnic gas generating material. The pyrotechnic gas generating material provides some exit gases to inflate the airbag. Furthermore, the pyrotechnic can be used to also heat and expand the stored gas to enhance its contribution to inflating the airbag. Some inflators will produce the required exit gases from a compressed liquid or gas, while others will generate the exit gases through a combination of material decomposition and gaseous reaction. Furthermore, hybrid inflators may also include a heating composition as part of the igniting assembly. The heating composition typically comprises of a non gas-producing material which heats the exit gases as they pass through the heating composition. The heating composition boosts the inflation rate of the exit gases and therefore increases the expansion of the gas flowing therethrough.

In addition to there being many types of inflators, there are also numerous types of igniting assemblies or squibs which produce the exit gases. Squibs may be, for example, a pyrotechnic, a bridgewire, a spark-discharge, a heated or exploding wire/foil, or a semi-conductor bridge (SCB). Furthermore, each squib may incorporate a projectile type device to start the inflation of the airbag.

Regardless of the type of inflator or squib that is used in the particular inflatable device, the manufacture of an inflator requires joining of numerous components together. For example, in a stored gas inflator, it is necessary to weld a burst disk between a gas containing tube and a diffuser. Furthermore, it is also necessary to weld an end closure/igniting assembly to the gas containing tube. The processes traditionally used to join the above components have, however, a number of limitations.

Traditionally, the inflator components are joined together through a multi-step process. The multi-step process may include, for example in a stored gas inflator, first, forming an inflator body, usually from a metal tube; second, welding an end closure/igniting assembly to the body; third, welding a burst disk to the body; fourth, welding a diffuser to the top of the tube, fifth, filling the inflator with a gas and sealing the fill port; and sixth, checking the inflator for leaks.

One of the most time consuming steps in manufacturing an inflator is the manufacture of the end closure/igniting assembly and connecting the assembly to the inflator body. For example, in a glass to metal igniting assembly, the end closure is formed from a glass body which is fixed within a metal housing. A number of initiator pins are located within the glass body which are configured to connect with an external electrical source. Once the glass body is fixed to the metal housing, a bridging element is welded, soldered, brazed or bonded to the initiator pins. After the bridging element is securely fixed in place a pyrotechnic mixture is added to the bridging element. In some circumstances an output charge is also added to the inflator. The bridging element acts as an initiator either to ignite a pyrotechnic or, in the case of a hybrid or stored gas inflator, to activate the pressurized gases within the inflator. Finally, the end closure is welded or crimped to the bottom of the body to form the completed inflator.

This process of manufacturing both the end closure/igniting assembly and the inflator is time consuming because of the precision required for pressure vessel construction. In addition, there are a number of problems which may arise during the manufacturing process, such as during set-up or manufacturing operations.

Since there are many different welding and bonding operations, there is an increased likelihood for defects in the completed inflator. Defects may occur in the body of the inflator, in the welded areas of the inflator, or within the igniting assembly or the diffusing assembly. In particular, microcracks may form in the bonds between the glass body and the end closure, in the welds between the end closure and the inflator body, between the inflator body and the diffuser, and/or around the fill port.

Microcracks cause catastrophic failure of pressure vessels, such as inflators. As an inflator is used, the pressurized gas within the inflator body transfers energy to any microcrack contained with in the inflator body or joints. In a collision, the igniting assembly activates the gases and the pressure within the inflator increases. The increased pressure provides additional energy to the microcracks thereby increasing crack growth. If the pressure within the inflator becomes so great that a critical stress is reached, the pressure vessel catastrophically fails. Therefore, the inflator does not inflate the airbag and protect the occupant.

It would therefore be an advance to provide an inflator which reduces the possibility of structural defects, such as microcracks and leaks, while still providing an economical and efficient process of manufacture.

OBJECTS AND BRIEF SUMMARY OF THE INVENTION

It is an object of the present invention to provide an improved inflator with integral end closure and igniting assembly.

Yet another object of the present invention is to provide an inflator which has been designed so as to reduce the possibility of structural defects.

An additional object of the present invention is to provide an inflator which requires a reduced amount of time and number of steps to manufacture.

It is another object of the present invention to provide an inflator which is manufactured from a reduced number of pieces.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objectives, and in accordance with the invention as embodied and broadly described herein, an inflator assembly for an airbag safety system is provided that comprises a container having an interior chamber, an igniting assembly for producing exit gases and a diffusing assembly to vent the exit gases. The container is provided with an end closure that is composed substantially of a glass material. The diffusing assembly includes a diffuser cap and a burst disk. The diffuser cap has a number of apertures formed therein that allow the exit gases to be released when the burst disk ruptures. The igniting assembly is configured such that it may be coupled to the end closure and is capable of withstanding a heat treatment process that bonds the igniting assembly end closure and container together to form a one-piece structure.

BRIEF DESCRIPTION OF THE DRAWINGS

In order to more fully understand the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention in its presently understood best mode for making and using the same will be described and explained with additional specificity and detail through the use of the accompanying drawings in which:

FIG. 1 is a cross-sectional side view of one embodiment of an inflator device; and FIG. 2 is a cross-sectional side view of an alternate embodiment of an inflator device in FIG. 1.

FIG. 3 us a cross-sectional side view of a second alternate embodiment of an inflator device in FIG. 1.

DETAILED DESCRIPTION OF THE PREFERRED EMBODIMENTS

The present invention is related to an inflator device which may be used to inflate an airbag used in conjunction with a vehicle safety system. The inflator device is configured so as to have a generally one-piece form having an integral end closure and initiating assembly. The inflator device reduces the possibility of manufacturing defects by limiting the number of bonding operations required during the manufacture of the inflator device. Furthermore, by being configured with a one-piece form, the inflator device is easily and inexpensively manufactured and only requires one welding operation.

FIG. 1 depicts one embodiment of an inflator 20 used to produce gases to fill an airbag (not shown). Inflator 20 remains inactive until a collision occurs, and then rapidly produces gases, termed exit gases, which are released to inflate an airbag. Generally speaking, inflator 20 includes a container 22, an end closure 32, an igniting assembly 36, and a diffuser assembly 42. As described herein, inflator 20 has the form of a hybrid inflator. This is only one illustrative embodiment of the invention disclosed herein and does not limit the scope of the invention. The same principles of the invention apply to stored gas, pyrotechnic and/or other types of inflators.

According to one aspect of the present invention, as shown in FIGS. 1, container 22 comprises a first end 24, a second end 26 and a recess 30. Container 22 has a structure sufficient to withstand the pressures exerted by the pressurized gases contained within and is of a size consistent with the use as a pressure vessel for a vehicle safety system. Container 22 is formed such that the other features of inflator 20 may be easily attached thereto, while retaining the requisite strength and rigidity of a pressure vessel. In one configuration, container 22 has a generally tubular form, where first end 24 has generally a smaller cross-section than second end 26. Recess 30 is formed at first end 24 and is capable of retaining igniting assembly 36. As shown in FIG. 2, a chamber 28 passes longitudinally from first end 24 to second end 26 and is of a sufficient size to contain the desired quantity of pressurized gases. One example of structure capable of performing the function of container 22 is a thick-walled tube modified such that first end 24 has a smaller cross-sectional area than second end 26. It may be appreciated that container 22 may have various other configurations than are described herein. For example, another example of structure capable of performing the function of container 22 is a thin-walled tube modified to provide first end 24 with a smaller cross-section than second end 26. In yet another configuration, first end 24 and second end 26, of container 22 may be the same size. Furthermore, in another alternate configuration, first end 24 may have a greater cross-section then second end 26. Various other configurations of container 22 are also effective in carrying out the intended function thereof Container 22 is preferably composed of materials which will provide sufficient strength and rigidity to securely contain the pressurized gases. The types of material range from InConel, steel, aluminum, and alloys thereof. It is preferred that container 22 be substantially composed of steel or any alloy thereof.

According to one aspect of the present invention, as shown in FIG. 1, inflator 20 also comprises igniting means for producing exit gases. One embodiment of structure capable of performing the function of such an igniting means, as shown by way of example and not limitation in FIG. 1 in relation to a hybrid inflator, comprises igniting assembly 36. Igniting assembly 36 comprises a plurality of initiator pins 38 and a bridging element 40. Initiator pins 38 are partially located within container 22 and partially within recess 30, as shown in FIG. 2. Initiator pins 38 act as conductors of electrical current to allow current to pass from an electrical source to bridging element 40. The electrical current activates bridging element 40 which results in the activation of the pressurized gases and production of the exit gases both of which are used to inflate the airbag. Initiator pins 38 also have sufficient strength, rigidity and temperature resistant properties to remain intact during the manufacturing process. One embodiment of initiator pins 38 is two copper rods. Other possible illustrative materials include steel, stainless steel, aluminum and alloys thereof. Various other types and/or configurations of initiator pins 38 could be used and perform the function thereof.

Bridging element 40 also has sufficient strength, rigidity and temperature resistant properties to remain intact during the manufacturing process, and may conduct electrical current. In this illustrative embodiment, bridging element 40 is capable of initiating the rapid expansion of the pressurized gases contained within container 22 to produce the exit gases released from inflator 20. In other configurations, bridging element 40 may dissociate the pressurized gas within container 22, and activate a pyrotechnic or gas generating material to aid in the production of exit gasses. In another configuration bridging element 40 may activate a pyrotechnic which then produces exit gases. In this illustrative embodiment, bridging element 40 is contained within container 22 and is bonded to initiator pins 38. One embodiment of bridging element 40 is a semi-conductor bridge. Various other types of bridging element 40 could be used to perform the function thereof.

Additionally, one embodiment of igniting assembly 36 is particularly designed for use with the inflation system disclosed in U.S. Pat. No. 5,669,629, which is incorporated herein by reference. The pressurized gases are caused to move rapidly and expand through an exothermic decomposition process which produces exit gases. These exit gases have neither the toxic by-products nor the high temperatures associated with traditional gas inflation devices.

In addition, it is to be understood, that various other embodiments of igniting means for producing exit gases are also effective in carrying out the intended function thereof, and are known to one skilled in the art to provide ignition or creation of the exit gases. For example, igniting means could be in the form of a pyrotechnic, a bridgewire, a spark-discharge, a heated or exploding wire or foil. In general, igniting means is configured to produce a quantity of exit gases to inflate the airbag. More specifically, igniting means may dissociate a pressurized gas within container 22 to form the exit gas, may activate a gas generating material which in turn produces the exit gas, or a combination of activating and dissociating gases and materials.

According to one aspect of the present invention, as shown in FIG. 1, inflator 20 comprises end closure 32. End closure 32 securely fits within recess 30 such that first end 24 is sealed when end closure 32 is heated to about its melting point, as shown in FIG. 2. In one embodiment, end closure 32 has a generally cylindrical form, generally coinciding with the dimensions of recess 30, and is composed of glass. End closure 32 has a number of holes 34 formed therein. Holes 34 are designed to receive initiator pins 38 of igniting assembly 36. Initiator pins 38 are disposed in holes 34 of end closure 32 and bridging element 40 is connected to initiator pins 38. End closure 32, initiator pins 38 and bridging element 40 are heated such that they are bonded to container 22 and initiator pins 38, as shown in FIG. 2. The bond between these elements will withstand the pressures exerted by the pressurized gases contained within container 22, prevent the pressurized gases from leaking and withstand the pressures exerted by the exit gases as they leave container 22. It can be appreciated by one skilled in the art that end closure 32 may be modified for different coupling requirements of igniting assembly 36, and may have different dimensions which are dictated by the shape of recess 30 and first end 26. Various other embodiments of end closure 32 are also effective in carrying out the intended function thereof.

End closure 32 is preferably composed of materials similar to glass or ceramic. These may comprise, for example, of silica, or materials having a substantial silicon content, glass and any type of ceramic. It is preferred that end closure 32 be a glass to metal seal. In view of the teachings herein, one skilled in the art can identify various other materials which will perform the intended function of end closure.

According to one aspect of the present invention, inflator 20, as shown in FIG. 2, has diffusing means for venting the exit gases from chamber 28. One embodiment of structure capable of performing the function of such diffusing means, as shown by way of example and not limitation, comprises diffuser assembly 42. Diffuser assembly 42 comprises a diffuser cap 44 and a burst disk 48. Diffuser assembly 42 is coupled to second end 26 of container 22. Diffuser cap 44, in one illustrative embodiment, has a generally hemispheric form with a cross-section that is generally the same as second end 26. However, it is understood that diffuser cap 44 may have any form, known to one skilled in the art, to direct the flow of the exit gases from container 22. For example, diffuser cap 44 may be conical, cubic, or the like. Diffuser cap 44 provides an exit for the exit gases and a way of directing the exiting gas into the airbag. Diffuser cap 44, in one embodiment has a plurality of apertures 46 formed therein. Apertures 46, as shown illustratively in FIG. 1, are generally cylindrical in form. However, it is understood that apertures 46 may have any form, known to one skilled in the art, to provide sufficient exit volume of the exit gases to inflate the airbag quickly and efficiently. For example, apertures 46 may be conical, cubic, oval shaped or the like. In addition, the number and location of apertures 46 may vary for other configurations so long as apertures 46 allow the exit gases to exit inflator 20 rapidly. In addition, various embodiments of diffuser cap 44 are also effective in carrying out the intended function thereof.

Diffuser cap 44 is preferably composed of materials which will provide sufficient strength and rigidity to not fracture when the exit gases are released. It is preferred that diffuser cap 44 be substantially composed of the same materials as container 22. In the preferred embodiment, diffuser cap 44 is composed of steel or an alloy thereof. Diffuser cap 44 is coupled to container 22 through conventional attachment methods such as a welding, bolting, brazing, bonding, gluing and the like. It is preferred that diffuser cap 44 be coupled to container 22 by a welding process. This process may be achieved either through TIG, MIG, Laser, or inertial welding processes, or other similar conventional manufacturing processes which will provide sufficient strength, rigidity, and leak resistance between diffuser cap 44 and container 22. It is to be understood, however, that diffuser cap 44 may be connected to container 22 in any manner known by one skilled in the art.

Burst disk 48 is connected to diffuser cap 44 distal from apertures 46. Burst disk 48, in one embodiment, has a generally circular form, and has generally the same cross-section as second end 26. For a short time, burst disk 48 is capable of withstanding the forces exerted by the exit gases once igniting assembly 36 has been activated. Once the pressure exerted against burst disk 48 is sufficient, burst disk 48 will rupture and allow the exit gases to flow into diffuser cap 44 and through apertures 46. In one embodiment, burst disk 48 is connected to second end 26 of container 22. In other embodiments of the present invention, burst disk 48 could be located at various longitudinal locations within chamber 28. In view of the teachings herein, one skilled in the art can identify various other locations and configurations of burst disk 48 which are also effective in carrying out the intended function thereof.

Burst disk 48 is preferably composed of materials which will provide sufficient strength and rigidity, while being capable of rupturing at a desired pressure. For example, illustrative materials comprise stainless steel, aluminum, InConel and alloys thereof. It is preferred that burst disk 48 be substantially composed of InConel.

FIG. 3 illustrates a second embodiment of inflator 120. The majority of the features previously discussed apply to the second embodiment of inflator 120. The features which are not effected are identified with the same reference numbers as used in FIG. 1. Only those features that have changed will be described in detail.

Referring now to FIG. 3, an alternative embodiment of inflator 120 has a container 122, end closure 32, igniting assembly 36, and diffusing assembly 42. First end 124, however, has outwardly radially extending flanges 125. Flanges 125, in one embodiment, may be used as a connector retaining attachment when inflator 20 is connected to the body of a vehicle as part of the safety system. As depicted in FIG. 3, flange 125 is substantially perpendicular to first end 124 of container 122. It can be appreciated that flanges 125 can be at various angles relative to first end 124. Various embodiments of flanges 125 are also effective in carrying out the intended function thereof. In addition, various embodiments of connector retaining attachments are known by one skilled in the art and are also effective in carrying out the intended function thereof.

Returning to FIG. 1, in assembling inflator 20, igniting assembly 36 is clamped to end closure 32. In one illustrative embodiment, initiator pins 38 are inserted into holes 34 formed in end closure 32. Additionally, bridging element 40 is clamped to initiator pins 38 and end closure 32 to form an end closure unit. Bridging element 40 is preferably a semiconductor bridge (SCB). The end closure unit is inserted into recess 30 in first end 24 of container 22 and clamped in place. The combination of end closure unit and container 22 is placed within a heat treatment device. In one embodiment, this is a furnace, however it may be appreciated by one skilled in the art that any type of heat treatment device is also effective in performing the function thereof. The combination of elements is then heated until at least the melting point of end closure 32. As end closure 32 melts, it bonds with igniting assembly 36 and container 22 so that when the combination of elements is removed and cooled, they form a one-piece structure.

In one embodiment, where end closure 32 is made of a glass material termed "glass to metal", the furnace is heated to between 2000 to 3000 degrees Fahrenheit. In the preferred embodiment, the furnace is heated to substantially 2400 degrees Fahrenheit. It may be appreciated by one skilled in the art that various temperatures are required dependent on the material from which end closure 32 is manufactured. Additionally, the time which the combination of elements must remain within the furnace varies based on the size and material from which end closure 32 is made. In the preferred embodiment, end closure 32 is made of "glass to metal" and the combination of elements remains within the furnace for about twenty (20) minutes. It may be appreciated by one skilled in the art that various times are required dependant on the type of material from which end closure 32 is manufactured, as well as the efficiency and type of furnace or heat treatment apparatus that is being used.

Container 22 is next filled with pressurized gases using a gas filling machine. In one embodiment, the pressurized gases are in a liquid cooled state, and a cryogenic gas machine is used to fill container 22. The pressurized gases in one embodiment, may comprise an inert gas such as argon, helium, nitrogen, and oxygen. In addition, the pressurized gases may be comprised partially of a reactive gas which has inert gas characteristics below a certain temperature. One example of such a gas is nitrous oxide. It is preferred that the pressurized gases comprise of nitrous oxide, since a nitrous oxide mixture can be initiated through the use of an SCB without the addition of a pyrotechnic. By so doing, the costs associated with the manufacture of inflator 20 are reduced. It can be appreciated by one skilled in the art that different gases may be used to fill container 22. Various other methods and machines could be used to perform the function of filling container 22.

Referring now to FIG. 2, once container 22 is filled, diffuser cap 44 and burst disk 48 are welded to second end 26 of container 22, and inflator 20 is checked for leaking gas. Illustrative processes for welding diffuser cap 44 and burst disk 48 to container 22 may include TIG, MIG, Laser, or inertial welding processes, or other similar manufacturing processes. One illustrative embodiment of the type of leak checking machine which may be used is a Krypton-85 leak checking machine. Various other embodiments of leak checking machines or apparatus are also effective in carrying out the intended function thereof. It can be appreciated by one skilled in the art that different types of gases will require different apparatus or devices to check for leaks. Furthermore, the same intended result for the manufacture of an integral, one-piece inflator may be achieved through different manufacturing processes or in a differently ordered steps. Additionally the manufacturing processes used to form inflator 20 may only require the use of non-inflator specific welding machines, cryogenic gas machines and leak checking machines. It will be appreciated that various manufacturing processes are also effective in carrying out the intended function of bonding the previously discussed elements together to form a one-piece structure and filling container 22 with pressurized gases, and checking for leaks.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An inflator device for an airbag safety system comprising:

(a) a container having a chamber and an end closure, said chamber holding a pressurized gas composed of a mixture of an inert gas and nitrous oxide, said end closure being substantially composed of a silicon dioxide containing material;

(b) an igniting assembly configured to produce exit gases, said igniting assembly comprising an initiator pin and a bridging element, said igniting assembly, said end closure, and said container being heated together, thereby causing said end closure to melt so as to be bonded to said container and said igniting assembly such that an integral, one-piece structure is formed, wherein said bridging element and said initiator pin are composed of a material which can withstand being heated to substantially the melting point of said end closure; and (c) a diffusing assembly configured to vent the exit gases from said chamber.

2. An inflator device as recited in claim 1, wherein said end closure is generally cylindrical.

3. An inflator device as recited in claim 1, further comprising a radially extending retention flange attached to a first end of said container.

4. An inflator device as recited in claim 1, wherein said diffusing means comprises a generally cylindrical diffuser cap and a burst disk coupled thereto, said diffuser cap being provided with a plurality of apertures formed therein.

5. An inflator device as recited in claim 1, wherein said bridging element is coupled to said initiator pin.

6. An inflator assembly as recited in claim 1, wherein said initiator pin, said bridging element, said end closure and a first end of said container are bonded together.

7. An inflator device as recited in claim 1, wherein said igniting means, said end closure and said container being heat together until said end closure has substantially reached its melting point.

8. An inflator device as recited in claim 1, wherein said initiator pin and said bridging element are bonded together upon cooling.

9. An inflator device as recited in claim 1, wherein said initiator pin and said bridging element are bonded to said container.

10. An inflator device as recited in claim 1, wherein said bridging element comprises a semi-conductor bridge.

11. An inflator device for an airbag safety system comprising:

(a) a container having a chamber and an end closure, said chamber holding a pressurized gas composed of a mixture of an inert gas and nitrous oxide, said end closure being substantially composed of a ceramic material;

(b) an igniting assembly configured to produce exit gases, said igniting assembly comprising an initiator pin and a bridging element, said igniting assembly, said end enclosure, and said container being heated together, thereby causing said end closure to melt so as to be bonded to said container and said igniting assembly such that an integral, one-piece structure is formed, wherein said bridging element and said initiator pin are composed of a material which can withstand being heated to substantially the melting point of said end closure; and (c) a diffusing assembly configured to vent the exit gases from said chamber, said diffusing assembly comprising a diffuser cap with a plurality of apertures formed therein and a burst disk, said burst disk being attached to said diffuser cap distal of said plurality of apertures.

12. An inflator device as recited in claim 11, wherein said end closure is generally cylindrical.

13. An inflator device as recited in claim 11, further comprising a radially extending retention flange attached to a first end of said container.

14. An inflator device as recited in claim 11, wherein said diffusing means comprises a generally cylindrical diffuser cap and a burst disk coupled thereto, said diffuser cap being provided with a plurality of apertures formed therein.

15. An inflator device as recited in claim 11, wherein said bridging element is coupled to said initiator pin.

16. An inflator assembly as recited in claim 11, wherein said initiator pin, said bridging element, said end closure and a first end of said container are bonded together.

17. An inflator device as recited in claim 11, wherein said igniting means, said end closure and said container being heat treated until said end closure has substantially reached its melting point.

18. An inflator device as recited in claim 11, wherein said initiator pin and said bridging element are bonded together upon cooling.

19. An inflator device as recited in claim 11, wherein said initiator pin and said bridging element are bonded to said container.

20. An inflator device as recited in claim 11, wherein said bridging element comprises a semi-conductor bridge.

21. An inflator assembly comprising:

a container having a chamber configured to hold a pressurized gas, the chamber further having a first end and a second end, the first end having a rounded interior surface in communication with the chamber;

an igniting assembly having an initiator pin and a bridging element; and an end closure shaped to receive the initiator pin and to be inserted into the first end of the container to abut the rounded interior surface, the end closure having a silicon dioxide composition selected to bond with the rounded interior surface and the initiator pin when the container, end enclosure, and igniting assembly are heated to a temperature above a melting point of the silicon dioxide composition.

22. The inflator assembly of claim 21, wherein the end closure forms a seal with the rounded interior surface to keep the pressurized gas within the chamber.

23. The inflator assembly of claim 22, wherein the seal comprises glass to metal.

24. The inflator assembly of claim 21, wherein the melting point of the silicon dioxide composition is between 2,000 and 3,000 degrees Fahrenheit.

25. The inflator assembly of claim 21, wherein the bridging element comprises a semiconductor exposed to the pressurized gas to directly activate the pressurized gas.

26. The inflator assembly of claim 21, wherein the rounded interior surface and the end closure have a substantially cylindrical shape, the rounded interior surface having an inside diameter slightly larger than an outside diameter of the end closure.

27. The inflator assembly of claim 25, wherein the chamber comprises a substantially cylindrical shape, the inside diameter of the rounded interior surface being smaller than an inside diameter of the chamber.

28. A method for installing an igniting assembly in a container to form an inflator assembly, the container having a chamber configured to hold a pressurized gas, a first end with a rounded interior surface in communication with the chamber, and a second end, the method comprising:

providing an end closure formed of a silicon dioxide composition, the end closure having a shape selected to fit into the first end of the container to abut the rounded interior surface, the end closure further being configured to receive the igniting assembly;

inserting the igniting assembly into the end closure;

inserting the end closure and the igniting assembly into the first end of the container such that the end closure abuts the rounded interior surface; and heating the container, the end closure, and the igniting assembly to a temperature above a melting point of the silicon dioxide composition to bond the end closure to the container and to the igniting assembly.

29. The method of claim 28, wherein heating the container, the end closure, and the igniting assembly comprises forming a seal at the first end of the container to prevent the pressurized gas from escaping past the end closure.

30. The method of claim 28, wherein heating the container, the end closure, and the igniting assembly comprises placing the container, the end closure, and the igniting assembly in an oven and heating the oven to a temperature ranging from about 2,000 degrees Fahrenheit to about 3,000 degrees Fahrenheit.

31. The method of claim 30, wherein the oven is heated to a temperature of about 2,400 degrees Fahrenheit.

32. The method of claim 28, further comprising attaching a bridging element of the igniting assembly to an initiator pin of the igniting assembly, the bridging element being exposed to enable the bridging element to directly activate the pressurized gas.

33. The inflator assembly of claim 28, wherein the rounded interior surface and the end closure have a substantially cylindrical shape, the rounded interior surface having an inside diameter slightly larger than an outside diameter of the end closure, and wherein inserting the end closure and the igniting assembly into the first end of the container comprises inserting the outside diameter of the end closure into the inside diameter of the rounded interior surface.

* * * * *